United States Patent
Uchida

(10) Patent No.: US 10,302,301 B2
(45) Date of Patent: May 28, 2019

(54) METHOD AND APPARATUS FOR CONTROLLING INLET TEMPERATURE OF DEDUSTING APPARATUS IN OXYGEN COMBUSTION BOILER EQUIPMENT

(71) Applicant: IHI Corporation, Koto-ku (JP)

(72) Inventor: Terutoshi Uchida, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/625,575

(22) Filed: Jun. 16, 2017

(65) Prior Publication Data
US 2017/0284668 A1 Oct. 5, 2017

Related U.S. Application Data

(63) Continuation of application No. PCT/JP2015/073107, filed on Aug. 18, 2015.

(30) Foreign Application Priority Data

Dec. 16, 2014 (JP) ................... 2014-253903

(51) Int. Cl.
*F23C 9/00* (2006.01)
*F23L 7/00* (2006.01)
(Continued)

(52) U.S. Cl.
CPC ............. *F23L 7/007* (2013.01); *F23C 9/00* (2013.01); *F23C 99/00* (2013.01); *F23J 15/00* (2013.01); *F23J 15/022* (2013.01); *F23L 7/00* (2013.01); *F23L 15/04* (2013.01); *F23N 5/00* (2013.01); *F23C 2202/10* (2013.01);
(Continued)

(58) Field of Classification Search
CPC .......... F23L 7/007; F23L 15/04; F23J 15/022; F23N 5/00; F23N 2021/08; F23C 2202/10
See application file for complete search history.

(56) References Cited

U.S. PATENT DOCUMENTS

2008/0286707 A1 11/2008 Panesar et al.
2009/0031933 A1 2/2009 Ookawa et al.
(Continued)

FOREIGN PATENT DOCUMENTS

JP 4-141214 5/1992
JP 2004-154683 6/2004
(Continued)

OTHER PUBLICATIONS

International Search Report dated Nov. 17, 2015 in PCT/JP2015/073107, filed on Aug. 18, 2015.

*Primary Examiner* — David J Laux
(74) *Attorney, Agent, or Firm* — Oblon, McClelland, Maier & Neustadt, L.L.P.

(57) ABSTRACT

A combustion-support-gas bypass line is provided to cause combustion support gas to bypass a preheater. A combustion-support-gas flow control damper is provided in the combustion-support-gas bypass line. An inlet temperature of a deduster is measured by a temperature sensor and the inlet temperature measured by the temperature sensor is inputted to a controller and is compared with a set temperature more than an acid dew-point preliminarily set in the controller. On the basis of a comparison result, an opening-degree control signal is outputted from the controller to the combustion-support-gas flow control damper so as to make the inlet temperature to a set temperature more than an acid dew-point.

2 Claims, 4 Drawing Sheets

(51) Int. Cl.

| | |
|---|---|
| *F23N 5/00* | (2006.01) |
| *F23C 99/00* | (2006.01) |
| *F23J 15/00* | (2006.01) |
| *F23J 15/02* | (2006.01) |
| *F23L 15/04* | (2006.01) |

(52) U.S. Cl.
CPC ....... *F23C 2202/30* (2013.01); *F23J 2217/10* (2013.01); *F23L 2900/07001* (2013.01); *F23N 2021/08* (2013.01); *Y02E 20/322* (2013.01)

(56) References Cited

U.S. PATENT DOCUMENTS

| | | |
|---|---|---|
| 2009/0297993 A1 | 12/2009 | Fan et al. |
| 2010/0212555 A1 | 8/2010 | Yamada et al. |
| 2011/0048295 A1 | 3/2011 | Yamada et al. |
| 2011/0081297 A1 | 4/2011 | Barrow et al. |
| 2012/0272626 A1 | 11/2012 | Mitsui et al. |
| 2013/0244190 A1 | 9/2013 | Marumoto et al. |
| 2014/0373762 A1 | 12/2014 | Uchida |

FOREIGN PATENT DOCUMENTS

| | | |
|---|---|---|
| JP | 2007-147161 | 6/2007 |
| JP | 2010-196962 | 9/2010 |
| JP | 2011-153765 | 8/2011 |
| JP | 2011-523997 | 8/2011 |
| JP | 2014-59104 | 4/2014 |
| JP | 5489254 | 5/2014 |
| WO | WO 2009/110031 A1 | 9/2009 |
| WO | WO 2011/064975 A1 | 6/2011 |
| WO | WO 2013/136782 A1 | 9/2013 |

METHOD AND APPARATUS FOR CONTROLLING INLET TEMPERATURE OF DEDUSTING APPARATUS IN OXYGEN COMBUSTION BOILER EQUIPMENT

TECHNICAL FIELD

The present disclosure relates to a method and an apparatus for controlling an inlet temperature of a deduster in an oxyfuel combustion boiler installation.

BACKGROUND ART

A coal-fired power generation installation using a pulverized coal-fired boiler has occupied an important role due to recent situations such as price increase of petroleum and natural gas resulting from increased demand thereon. Generally used as a conventional pulverized coal-fired boiler is an air combustion boiler using air as combustion support gas.

Coal combustion itself has a problem of much $CO_2$ emission in comparison with petroleum or natural gas combustion. Thus, increased emission of $CO_2$ due to increased dependence on coal-fired power generation is a serious problem to be avoided from a viewpoint of preventing global warming.

The air combustion boiler, which contains much nitrogen in flue gas, has a problem that troublesome are separation and withdrawal of nitrogen and $CO_2$ from the flue gas.

Thus, an oxyfuel combustion boiler draws attention as means for substantially reducing $CO_2$ emission to the atmosphere and development thereof has been advanced.

Employed in the oxyfuel combustion boiler is flue gas recirculation in which most of flue gas discharged from the pulverized coal-fired oxyfuel combustion boiler is extracted halfway from a gas flue, and the flue gas extracted and mixed with oxygen produced in an oxygen producer and adjusted to have a proper oxygen concentration is supplied as combustion support gas to the oxyfuel combustion boiler. According to the flue gas recirculation type oxyfuel combustion boiler, no nitrogen is contained in the flue gas and a $CO_2$ concentration is dramatically enhanced in the flue gas finally discharged, which facilitate separation and withdrawal of $CO_2$ from the flue gas.

There is, for example, the following Patent Literature 1 which shows general state-of-art technology pertinent to the oxyfuel combustion boiler.

CITATION LIST

Patent Literature

Patent Literature 1: JP 2014-59104A

SUMMARY

Technical Problems

In an oxyfuel combustion operation of an oxyfuel combustion boiler, a preheater which preheats combustion support gas to be recirculated has a lower-temperature-side inlet gas temperature of the order of 100-150° C. unlike that of air combustion. Thus, inevitably, a higher-temperature-side outlet flue gas temperature higher than that of the air combustion operation and of the order of 180-230° C. In this case, a cold-end metal temperature is not less than an acid dew-point (a temperature at which the sulfurous acid gas condensates into sulfuric acid). Thus, there is no need of temperature control for prevention of acid dew-point corrosion at the flue gas outlet of the preheater.

However, the flue gas having passed through the preheater is further cooled by the flue gas cooler into a temperature of the order of 130-150° C. at an inlet of a deduster. Thus, prevention of sulfuric acid corrosion is required at the outlet of the flue gas cooler outlet (or at the inlet of the deduster); that is, required is temperature control to a temperature more than the acid dew-point. However, no specific countermeasures have been taken in existing circumstances.

The disclosure was made in view of the above-mentioned conventional problem and has its object to provide a method and an apparatus for controlling an inlet temperature of a deduster in an oxyfuel combustion boiler installation which can maintain an outlet of a flue gas cooler to a temperature more than an acid dew-point and can prevent sulfuric acid corrosion of a deduster.

Solution to Problems

The disclosure is directed to a method for controlling an inlet temperature of a deduster in an oxyfuel combustion boiler installation comprising a boiler for burning fuel by means of combustion support gas to generate steam, a preheater for preheating the combustion support gas by means of flue gas discharged from the boiler, a flue gas cooler for cooling the flue gas having passed through the preheater, a deduster for capturing dust in the flue gas cooled by the flue gas cooler, a flue gas recirculation line through which the flue gas dedusted by the deduster is recirculated as part of the combustion support gas for the boiler and an oxygen producer for supplying oxygen to the flue gas to be recirculated through the flue gas recirculation line, the method comprising measuring an inlet temperature of the deduster and causing the combustion support gas to bypass the preheater so as to make the measured inlet temperature into a set temperature more than an acid dew-point.

In the method for controlling the inlet temperature of the deduster in the oxyfuel combustion boiler installation that after the inlet temperature control by causing the combustion support gas to bypass the preheater reaches a limit, the flue gas may be caused to bypass the flue gas cooler so as to make the measured inlet temperature to the set temperature more than the acid dew-point.

The disclosure is further directed to an apparatus for controlling an inlet temperature of a deduster in an oxyfuel combustion boiler installation which comprises a boiler for burning fuel by means of combustion support gas to generate steam, a preheater for preheating the combustion support gas by means of flue gas discharged from the boiler, a flue gas cooler for cooling the flue gas having passed through the preheater, a deduster for capturing dust in the flue gas cooled by the flue gas cooler, a flue gas recirculation line through which the flue gas dedusted by the deduster is recirculated as part of the combustion support gas for the boiler and an oxygen producer for supplying oxygen to the flue gas to be recirculated through the flue gas recirculation line, the apparatus further comprising a combustion-support-gas bypass line through which the combustion support gas is caused to bypass the preheater, a combustion-support-gas flow control damper provided in the combustion-support-gas bypass line, a temperature sensor for measuring an inlet temperature of the deduster and a controller for outputting an opening-degree control signal to the combustion-support-gas flow control damper so as to make the inlet temperature measured by the temperature sensor to a set temperature more than an acid dew-point.

In the apparatus for controlling the inlet temperature of the deduster in the oxyfuel combustion boiler installation that the apparatus may further comprises a flue-gas bypass line through which the flue gas is caused to bypass the flue gas cooler and a flue-gas flow control damper provided in the flue-gas bypass line and wherein, after the combustion-support-gas flow control damper is fully opened and reaches a limit thereof on the inlet temperature control, the controller outputs an opening-degree control signal to the flue-gas flow control damper so as to make the inlet temperature measured by the temperature sensor to the set temperature more than the acid dew-point.

Effects

The method and the apparatus for controlling the inlet temperature of the deduster in the oxyfuel combustion boiler installation according to the disclosure can exhibit excellent effects that the outlet of the flue gas cooler can be maintained to the temperature more than the acid dew-point and the sulfuric acid corrosion of the deduster can be prevented.

DESCRIPTION OF EMBODIMENTS

Embodiments of the disclosure will be described in conjunction with attached drawings.

Figure 1:
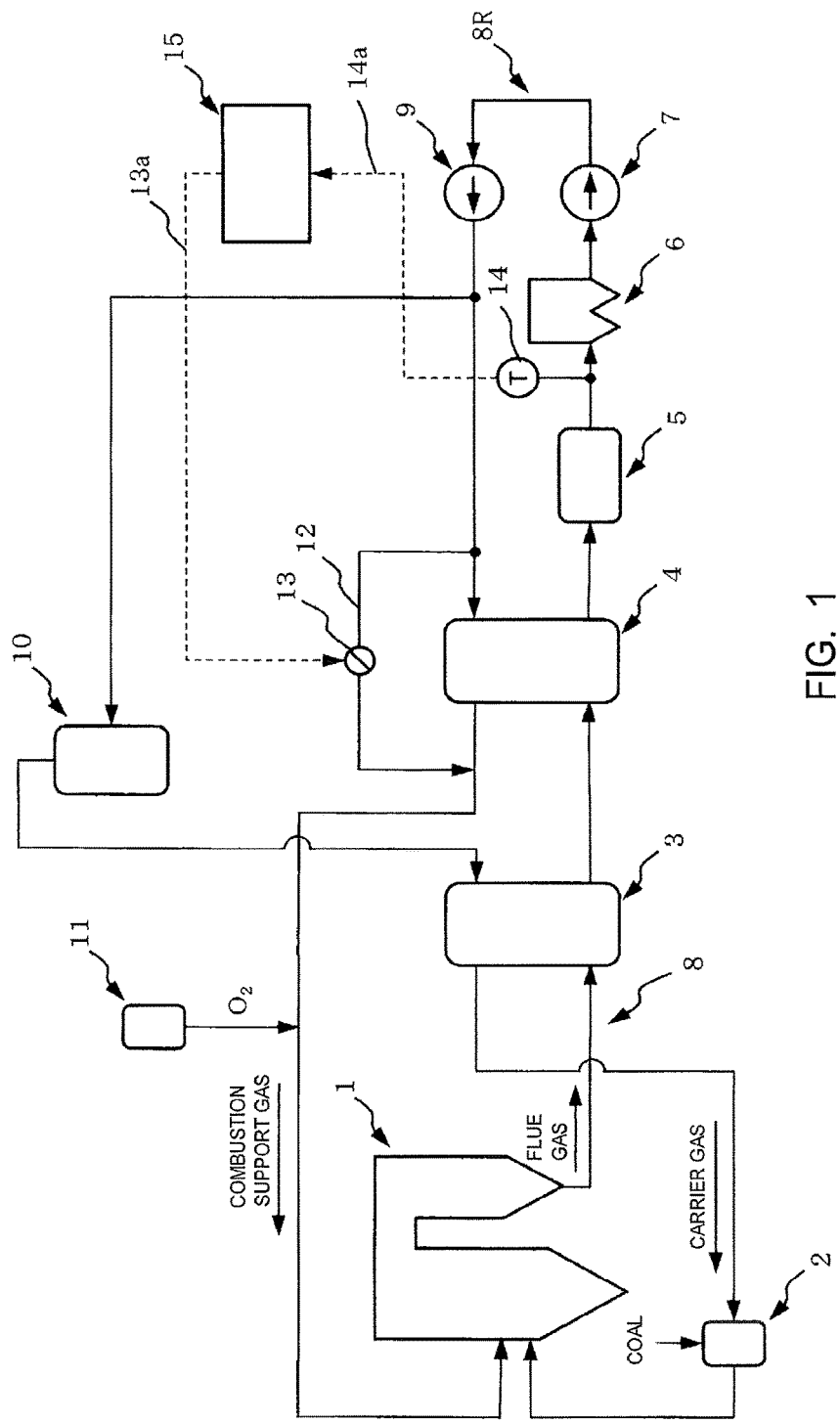
FIG. 1 is an overall schematic diagram showing a first embodiment of a method and an apparatus for controlling an inlet temperature of a deduster in an oxyfuel combustion boiler installation according to the disclosure.
Figure 2:
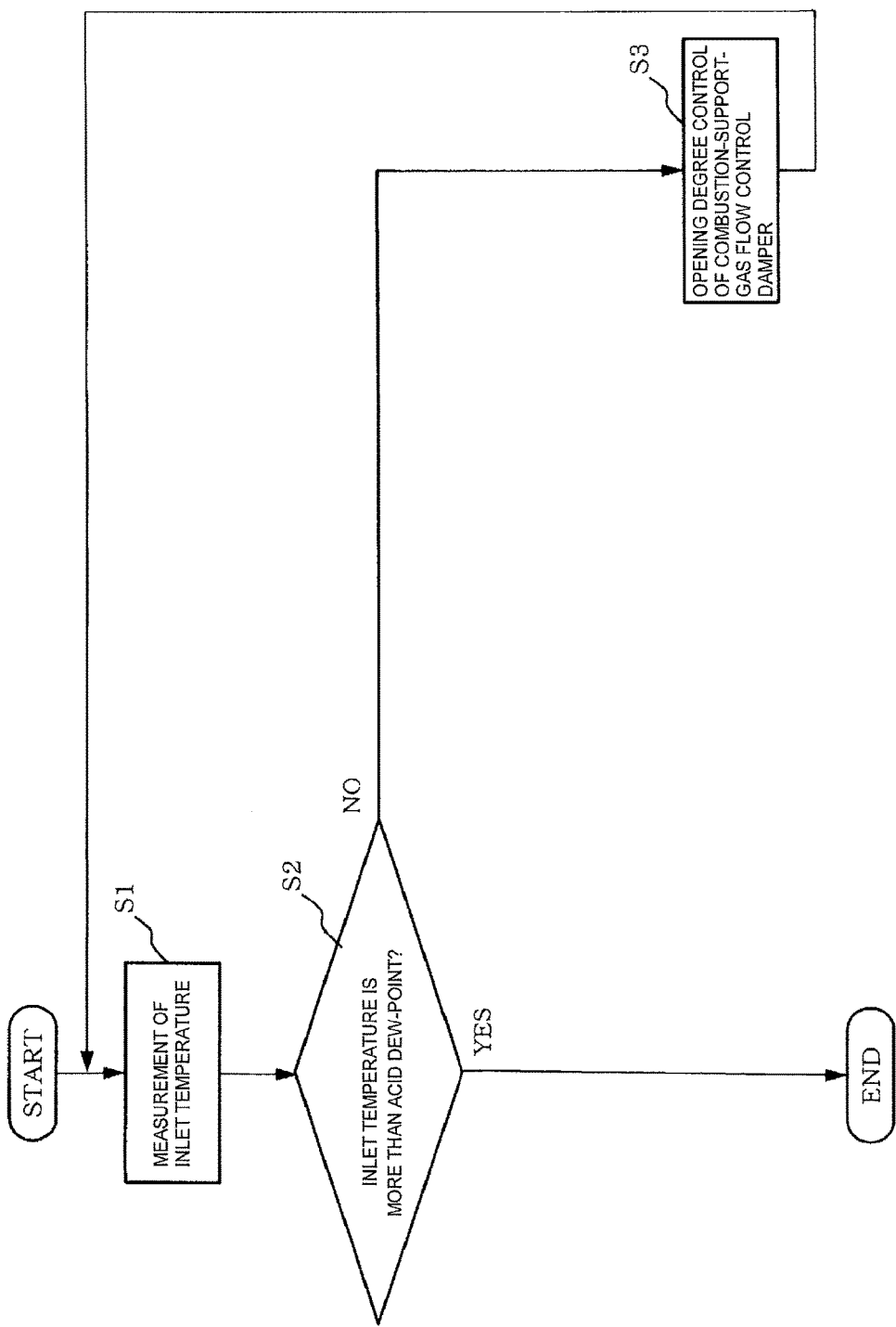
FIG. 2 is a flowchart showing control flow in the first embodiment of the method and the apparatus for controlling the inlet temperature of the deduster in the oxyfuel combustion boiler installation according to the disclosure.

FIGS. 1 and 2 show a first embodiment of a method and an apparatus for controlling an inlet temperature of a deduster in an oxyfuel combustion boiler installation according to the disclosure.

The oxyfuel combustion boiler installation shown in FIG. 1 comprises a boiler 1, a mill 2, preheaters 3 and 4, a flue gas cooler 5, a deduster 6, an induced draft fan 7 (IDF), a flue gas line 8, a flue gas recirculation line 8R, a forced draft fan 9 (FDF), a dehydrator 10 and an oxygen producer 11.

The boiler 1 is adapted to burn fuel by means of combustion support gas to generate steam and discharge flue gas to the flue gas line 8. The mill 2 is adapted to pulverize coal as the fuel. The preheater 3 is adapted to preheat carrier gas to be introduced into the mill 2 by means of the flue gas discharged from the boiler 1. The preheater 4 is adapted to preheat the combustion support gas by means of the flue gas discharged from the boiler 1. The flue gas cooler 5 is adapted to cool the flue gas having passed through the preheater 4. The deduster 6 is a bag filter or an electric dust collector and is adapted to capture dust in the flue gas cooled by the flue gas cooler 5. The flue gas recirculation line 8R is adapted for recirculation of the flue gas dedusted by the deduster 6 and used as carrier gas of the combustion support gas and the pulverized coal to the boiler 1, by the operation of the induced and forced draft fans 7 and 9. The dehydrator 10 is adapted to remove moisture from the flue gas to be recirculated as the carrier gas for the pulverized coal. The oxygen producer 11 is adapted to supply oxygen to the flue gas to be recirculated as combustion support gas for the boiler.

In the first embodiment, for communication of the combustion support gas by bypassing the preheater 4, inlet and outlet positions of the preheater 4 in the flue gas recirculation line 8R are interconnected by a combustion-support-gas bypass line 12, a combustion-support-gas flow control damper 13 is provided in the combustion-support-gas bypass line 12 and an inlet temperature 14a of the deduster 6 is measured by a temperature sensor 14. The inlet temperature 14a measured by the temperature sensor 14 is inputted to the controller 15 and is compared with a set temperature (e.g., 150° C.) preliminarily set in the controller 15 and more than an acid dew-point. On the basis of a comparison result, an opening-degree control signal 13a is outputted from the controller 15 to the combustion-support-gas flow control damper 13, thereby making the inlet temperature 14a to the set temperature more than the acid dew-point.

Control flow in the first embodiment is as shown in the flowchart in FIG. 2. First, in step S1, the inlet temperature 14a of the deduster 6 is measured by the temperature sensor 14. Whether the inlet temperature 14a is more than the acid dew-point or not is determined in the succeeding step S2. When the inlet temperature 14a is determined not to be more than the acid dew-point in step S2, then an opening degree of the combustion-support-gas flow control damper 13 is controlled in step S3. Then, the procedure is returned to step S1 where the inlet temperature 14a of the deduster 6 is measured. When the inlet temperature 14a is more than the acid dew-point in the succeeding step S2, the procedure is ended. If the inlet temperature 14a is determined not to be more than the acid dew-point in step S2, then the inlet temperature control by the opening degree control of the combustion-support-gas flow control damper 13 is repeated in step S3.

Next, mode of operation of the above-mentioned first embodiment will be described.

The pulverized coal as fuel pulverized in the mill 2 is supplied by means of the carrier gas preheated in the preheater 3 into the boiler 1 where the pulverized coal is burned by the combustion support gas preheated in the preheater 4 and steam is generated by combustion heat thereof.

The flue gas discharged from the boiler 1 to the flue gas line 8 affords heat to the carrier gas during passage thereof through the preheater 3, and further affords heat to the combustion support gas during passage thereof through the preheater 4.

In the oxyfuel combustion operation of the oxyfuel combustion boiler installation, the flue gas is cooled by the flue gas cooler 5 and then the dust is captured therefrom by the deduster 6; then, the flue gas is recirculated, as combustion support gas and carrier gas for the pulverized coal, through the flue gas recirculation line 8R to the boiler 1 by the operation of the induced and forced draft fans 7 and 9.

In the oxyfuel combustion operation of the oxyfuel combustion boiler installation, the inlet temperature 14a of the deduster 6 is measured by the temperature sensor 14 (see step S1 in FIG. 2) to determine whether the inlet temperature 14a is more than the acid dew-point or not (see step S2 in FIG. 2).

When the inlet temperature 14a is not more than the acid dew-point, the opening degree of the combustion-support-gas flow control damper 13 is controlled (see step S3 in FIG. 2) to increase a flow rate of the combustion support gas which bypasses the preheater 4 and flows through the combustion-support-gas bypass line 12, thereby attaining increase of the higher-temperature-side outlet flue gas temperature of the preheater 4. Then, the procedure is returned to step S1 where the inlet temperature 14a of the deduster 6 is measured, and the procedure is ended when the inlet temperature 14a is more than the acid dew-point in the succeeding step S2.

When the inlet temperature 14a is not more than the acid dew-point in step S2, the inlet temperature control is repeated by means of the opening degree control of the combustion-support-gas flow control damper 13.

As a result, when the flue gas having passed through the preheater 4 is further cooled by the flue gas cooler 5 into a temperature having a concern about sulfuric acid corrosion at the inlet of the deduster 6, the opening degree of the combustion-support-gas flow control damper 13 is controlled to increase the higher-temperature-side outlet flue gas temperature of the preheater 4, thereby suppressing temperature decrease of the flue gas.

Thus, the outlet of the flue gas cooler 5 can be maintained to be more than the acid dew-point and sulfuric acid corrosion of the deduster 6 can be prevented.

Figure 3:
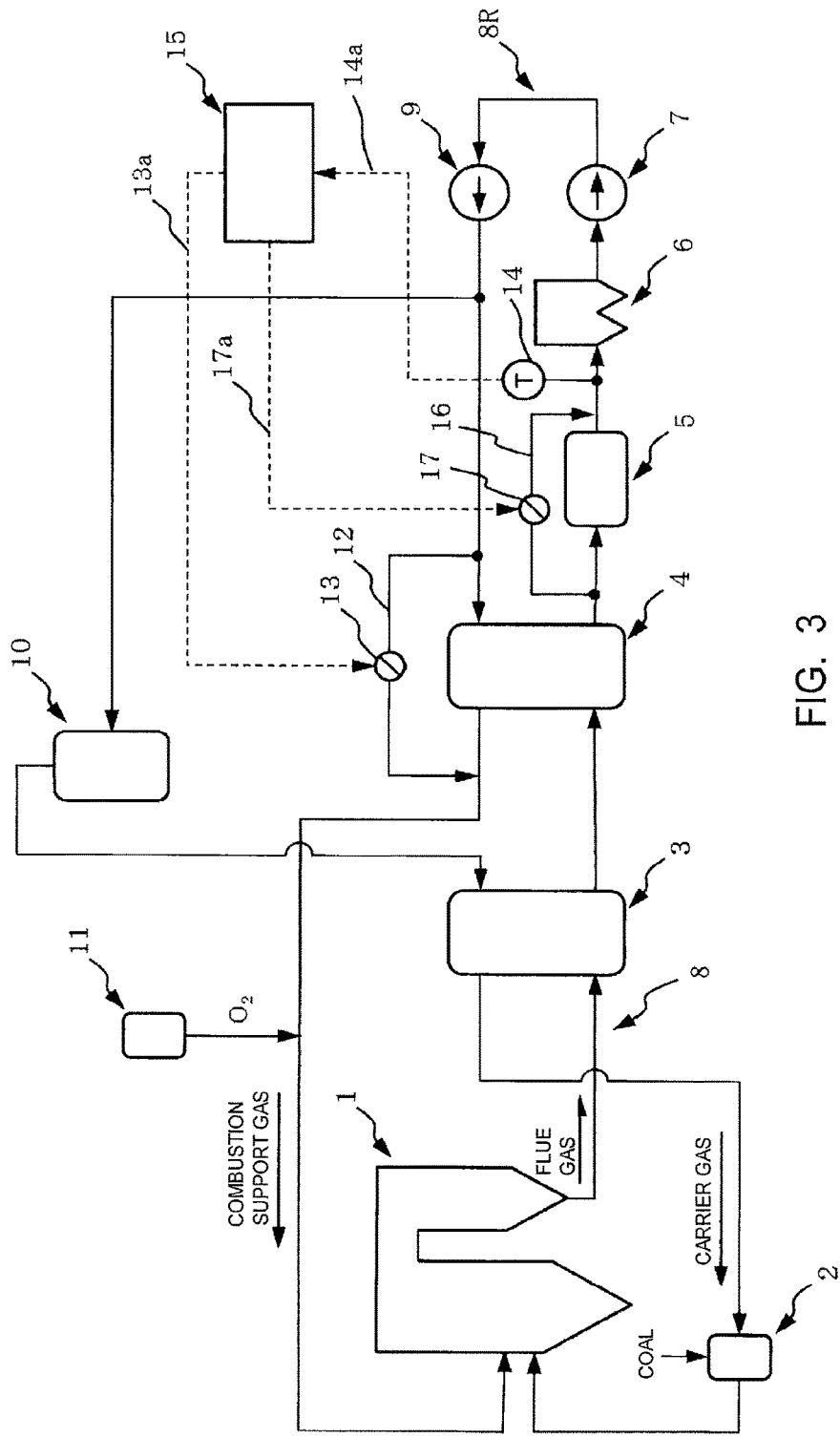
FIG. 3 is an overall schematic diagram showing a second embodiment of the method and the apparatus for controlling the inlet temperature of the deduster in the oxyfuel combustion boiler installation according to the disclosure.
Figure 4:
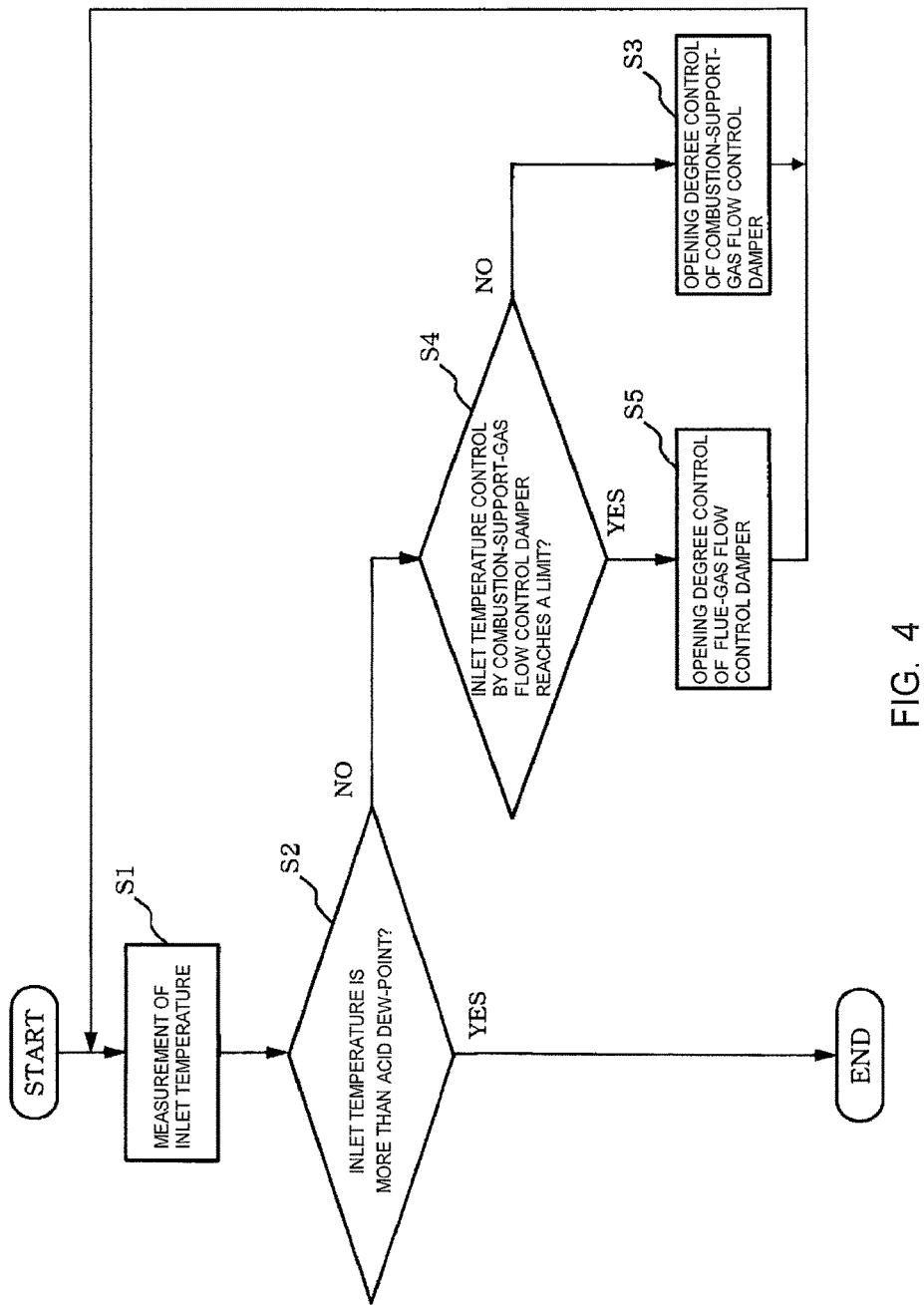
FIG. 4 is a flowchart showing control flow in the second embodiment of the method and the apparatus for controlling the inlet temperature of the deduster in the oxyfuel combustion boiler installation according to the disclosure.

FIGS. 3 and 4 show a second embodiment of the method and the apparatus for controlling the inlet temperature of the deduster in the oxyfuel combustion boiler installation according to the disclosure. In the figures, parts same as those in FIGS. 1 and 2 are represented by the same reference numerals. The second embodiment, which is similar in fundamental construction to the first embodiment shown in FIGS. 1 and 2, is characteristic in that, for communication of the flue gas by bypassing the flue gas cooler 5 as shown in FIGS. 3 and 4, inlet and outlet positions of the flue gas cooler 5 in the flue gas line 8 are interconnected by a flue-gas bypass line 16 and a flue-gas flow control damper 17 is provided in the flue-gas bypass line 16. After the inlet temperature control by the combustion-support-gas flow control damper 13 reaches a limit (or the combustion-support-gas flow control damper 13 is fully opened), the opening-degree control signal 17a is outputted from the controller 15 to the flue-gas flow control damper 17 on the basis of a result of comparison between the inlet temperature 14a and the set temperature, thereby making the inlet temperature 14a to the set temperature more than the acid dew-point.

Control flow in the second embodiment is as shown by the flowchart in FIG. 4. First, in step S1, the inlet temperature 14a of the deduster 6 is measured by the temperature sensor 14. Whether the inlet temperature 14a is more than the acid dew-point or not is determined in the succeeding step S2. When the inlet temperature 14a is determined not to be more than the acid dew-point in step S2, then whether the inlet temperature control by the combustion-support-gas flow control damper 13 reaches the limit or not is determined in step S4. When the inlet temperature control by the combustion-support-gas flow control damper 13 is determined not to reach the limit, the opening degree of the combustion-support-gas flow control damper 13 is controlled in step S3. Then, the procedure is returned to step S1 where the inlet temperature 14a of the deduster 6 is measured. The procedure is ended when the inlet temperature 14a is more than the acid dew-point in the succeeding step S2. When the inlet temperature 14a is determined not to be more than the acid dew-point in step S2, step S4 is conducted and is succeeded by step S3 where the inlet temperature control is repeated by means of the opening degree control by the combustion-support-gas flow control damper 13. When the inlet temperature control by the combustion-support-gas flow control damper 13 is determined to reach the limit thereof in step S4, the opening degree of the flue-gas flow control damper 17 is controlled in step S5 and the treatment and determination in steps S1, S2, S4 and S5 are repeated. The opening degree control of the flue-gas flow control damper 17 in step S5 is continued until the inlet temperature 14a becomes more than the acid dew-point.

Next, mode of operation of the above-mentioned second embodiment will be described.

Also in the second embodiment, in the oxyfuel combustion operation of the oxyfuel combustion boiler installation, the inlet temperature 14a of the deduster 6 is measured by the temperature sensor 14 (see step S1 in FIG. 4) to determine whether the inlet temperature 14a is more than the acid dew-point or not (see step S2 in FIG. 4).

When the inlet temperature 14a is not more than the acid dew-point, determination is made whether the inlet temperature control by the combustion-support-gas flow control damper 13 reaches the limit (or the combustion-support-gas flow control damper 13 is fully opened) or not (see step S4 in FIG. 4).

When the inlet temperature control by the combustion-support-gas flow control damper 13 does not reach the limit, then the opening degree of the combustion-support-gas flow control damper 13 is controlled (see step S3 in FIG. 4) to increase the flow rate of the combustion support gas which bypasses the preheater 4 and flows through the combustion-support-gas bypass line 12, thereby attaining increase of the higher-temperature-side outlet flue gas temperature of the preheater 4. Then, the procedure is returned to step S1 where the inlet temperature 14a of the deduster 6 is measured. The procedure is ended when the inlet temperature 14a is not less than the acid dew-point in the succeeding step S2.

When the inlet temperature 14a is not more than the acid dew-point in step S2, the inlet temperature control is repeated by means of the opening degree control by the combustion-support-gas flow control damper 13. When the inlet temperature 14a is not more than the acid dew-point and the inlet temperature control by the combustion-support-gas flow control damper 13 reaches the limit, then the opening degree of the flue-gas flow control damper 17 is controlled (see step S5 in FIG. 4) to increase the flow rate of the flue gas which bypasses the flue gas cooler 5 and flows through the flue-gas bypass line 16, thereby attaining increase of the outlet flue gas temperature of the flue gas cooler 5. The opening degree control of the flue-gas flow control damper 17 is repeated until the inlet temperature 14a becomes the set temperature more than the acid dew-point.

As a result, when the flue gas having passed through the preheater 4 is further cooled by the flue gas cooler 5 into a temperature having a concern of sulfuric acid corrosion at the inlet of the deduster 6 in the second embodiment, the opening degree of the combustion-support-gas flow control damper 13 is controlled to increase the higher-temperature-side outlet flue gas temperature of the preheater 4 and further, as needs demand, the opening degree of the flue-gas flow control damper 17 is controlled to decrease the flow rate of the flue gas cooled by the flue gas cooler 5, thereby suppressing temperature decrease of the flue gas.

Thus, also in the second embodiment, like the first embodiment, the outlet of the flue gas cooler 5 can be maintained to a temperature more than the acid dew-point and sulfuric acid corrosion of the deduster 6 can be prevented.

In the control method of the disclosure, after the inlet temperature control by causing the combustion support gas to bypass the preheater 4 reaches the limit, the flue gas may be caused to bypass the flue gas cooler 5 so as to make the measured inlet temperature 14a to the set temperature more than the acid dew-point as disclosed in the second embodiment, which enhances an extent of control and sulfuric acid corrosion of the deduster 6 may be prevented more effectively.

As disclosed in the second embodiment, the controlling apparatus of the disclosure may comprise the flue-gas bypass line 16 which causes the flue gas to bypass the flue gas cooler 5 and the flue-gas flow control damper 17 provided in the flue-gas bypass line 16. In this case, after the inlet temperature control by the combustion-support-gas flow control damper 13 reaches the limit, the controller 15 outputs the opening-degree control signal 17a to the flue-gas flow control damper 17 so as to make the inlet temperature 14a measured by the temperature sensor 14 to the set temperature more than the acid dew-point. This results in the inlet temperature control by the flue-gas flow control damper 17 as backup for the inlet temperature control by the combustion-support-gas flow control damper 13, which enhances the extent of control and sulfuric acid corrosion of the deduster 6 may be prevented more effectively.

It is to be understood that a method and an apparatus for controlling an inlet temperature of a deduster in an oxyfuel combustion boiler installation according to the disclosure is not limited to the above embodiments and that various changes and modifications may be made without departing from the scope of the disclosure.

REFERENCE SIGNS LIST 1 boiler
4 preheater
5 flue gas cooler
6 deduster
8R flue gas recirculation line
11 oxygen producer
12 combustion-support-gas bypass line
13 combustion-support-gas flow control damper
13a opening-degree control signal
14 temperature sensor
14a inlet temperature
15 controller
16 flue-gas bypass line
17 flue-gas flow control damper
17a opening-degree control signal

The invention claimed is:

1. A method for controlling an inlet temperature of a deduster in an oxyfuel combustion boiler installation comprising a boiler for burning fuel by means of combustion support gas to generate steam, a preheater for preheating the combustion support gas by flue gas discharged from the boiler, a flue gas cooler for cooling the flue gas having passed through the preheater, a deduster for capturing dust in the flue gas cooled by the flue gas cooler, a flue gas recirculation line through which the flue gas dedusted by the deduster is recirculated as part of the combustion support gas for the boiler and an oxygen producer for supplying oxygen to the flue gas to be recirculated through the flue gas recirculation line, the method comprising:

measuring an inlet temperature of the deduster and causing the combustion support gas to bypass the preheater so as to make the measured inlet temperature into a set temperature more than an acid dew-point, wherein after the inlet temperature control by causing the combustion support gas to bypass the preheater reaches a limit, the flue gas is caused to bypass the flue gas cooler so as to make the measured inlet temperature to the set temperature more than the acid dew-point.

2. An apparatus for controlling an inlet temperature of a deduster in an oxyfuel combustion boiler installation which comprises a boiler for burning fuel by means of combustion support gas to generate steam, a preheater for preheating the combustion support gas by means of flue gas discharged from the boiler, a flue gas cooler for cooling the flue gas having passed through the preheater, a deduster for capturing dust in the flue gas cooled by the flue gas cooler, a flue gas recirculation line through which the flue gas dedusted by the deduster is recirculated as part of the combustion support gas for the boiler and an oxygen producer for supplying oxygen to the flue gas to be recirculated through the flue gas recirculation line, the apparatus further comprising:

a combustion-support-gas bypass line through which the combustion support gas is caused to bypass the preheater;

a combustion-support-gas flow control damper provided in the combustion-support-gas bypass line;

a temperature sensor for measuring an inlet temperature of the deduster;

a controller for outputting an opening-degree control signal to the combustion-support-gas flow control damper so as to make the inlet temperature measured by the temperature sensor to a set temperature more than an acid dew-point;

a flue-gas bypass line through which the flue gas is caused to bypass the flue gas cooler; and a flue-gas flow control damper provided in the flue-gas bypass line, wherein after the combustion-support-gas flow control damper is fully opened and reaches a limit thereof on the inlet temperature control, the controller outputs an opening-degree control signal to the flue-gas flow control damper so as to make the inlet temperature measured by the temperature sensor to the set temperature more than the acid dew-point.

* * * * *